(12) United States Patent
Nishiyama

(10) Patent No.: US 11,087,482 B2
(45) Date of Patent: Aug. 10, 2021

(54) APPARATUS THAT GENERATES THREE-DIMENSIONAL SHAPE DATA, METHOD AND STORAGE MEDIUM

(71) Applicant: CANON KABUSHIKI KAISHA, Tokyo (JP)

(72) Inventor: Tomohiro Nishiyama, Tama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 47 days.

(21) Appl. No.: 16/446,774

(22) Filed: Jun. 20, 2019

(65) Prior Publication Data
US 2020/0005476 A1    Jan. 2, 2020

(30) Foreign Application Priority Data
Jun. 29, 2018 (JP) .............................. JP2018-124702

(51) Int. Cl.
| | | |
|---|---|---|
| *G06K 9/00* | (2006.01) | |
| *G06T 7/593* | (2017.01) | |
| *G06T 7/00* | (2017.01) | |
| *G06K 9/46* | (2006.01) | |

(52) U.S. Cl.
CPC ............ *G06T 7/593* (2017.01); *G06K 9/4609* (2013.01); *G06T 7/97* (2017.01); *G06T 2207/10012* (2013.01)

(58) Field of Classification Search
CPC ........ G06K 9/4609; G06T 2207/10012; G06T 2207/30196; G06T 2207/30221; G06T 7/564; G06T 7/593; G06T 7/97
See application file for complete search history.

(56) References Cited

U.S. PATENT DOCUMENTS

| | | | | |
|---|---|---|---|---|
| 10,262,458 B2* | 4/2019 | Blanchflower | ......... | G06T 19/20 |
| 10,304,203 B2* | 5/2019 | Forutanpour | ........... | G06T 5/005 |
| 2012/0314096 A1* | 12/2012 | Kruglick | ................ | G06T 11/60 |
| | | | | 348/222.1 |

(Continued)

FOREIGN PATENT DOCUMENTS

| | | |
|---|---|---|
| JP | 2011043879 A | 3/2011 |
| WO | 2014191055 A1 | 12/2014 |

OTHER PUBLICATIONS

Extended European Search Report issued in European Appln. No. 19181923.4 dated Sep. 18, 2019.

(Continued)

*Primary Examiner* — Avinash Yentrapati
(74) *Attorney, Agent, or Firm* — Rossi, Kimms & McDowell LLP

(57) ABSTRACT

An object of the present invention is to estimate the shape of an object easily and with a high accuracy. The present invention is a generation apparatus including: an acquisition unit configured to acquire a plurality of pieces of image data obtained by capturing an object from different directions by a plurality of image capturing apparatuses arranged at different positions, respectively; a first derivation unit configured to derive reliability for each of the image capturing apparatuses based on spatial resolution in the image data; and a generation unit configured to generate three-dimensional shape data representing the shape of the object based on the image data and the reliability.

18 Claims, 10 Drawing Sheets

(56) References Cited

U.S. PATENT DOCUMENTS

2018/0101979 A1* 4/2018 Higaki ................ G06T 7/55

OTHER PUBLICATIONS

Dyer "Volumetric Scene Reconstruction from Multiple Views" Foundations of Image Understanding. 2001: 469-488. Cited in NPL 1.

Wang "Active Key Frame Selection for 3D Model Reconstruction from Crowdsourced Geo-Tagged Videos" IEEE International Conference on Multimedia and Expo. Jul. 14, 2014. pp. 1-6. Cited in NPL 1.

* cited by examiner

APPARATUS THAT GENERATES THREE-DIMENSIONAL SHAPE DATA, METHOD AND STORAGE MEDIUM

BACKGROUND OF THE INVENTION

Field of the Invention

The present invention relates to a technique to estimate a shape of an object.

Description of the Related Art

Conventionally, there is a technique to obtain information on a distance to an object, to generate three-dimensional shape data of the object, and so on, based on images captured by a plurality of cameras. As one of such techniques, there is a method of generating three-dimensional shape data of an object by using the shape-from-silhouette based on a silhouette image of the object (for example, a binary image in which the pixel value in the object area is 255 and the pixel value in the other areas is 0). Japanese Patent Laid-Open No. 2011-43879 has disclosed a method of estimating a shape with a high accuracy by repeatedly performing shape estimation and processing to increase the accuracy of a silhouette image based on the knowledge obtained in advance that the shape of an object is smooth.

SUMMARY OF THE INVENTION

In a case where the method described in Japanese Patent Laid-Open No. 2011-43879 is used, on a condition that a loss occurs in the initial shape of an object used in the iterative processing, it is difficult to restore the initial shape even by the reiterative processing using the knowledge obtained in advance. Further, in a case where a part of the area of the initial shape expands from the true shape and the expanded shape is smooth, it is difficult to delete the expanded shape.

Consequently, in view of the problem described above, an object of the present invention is to estimate the shape of an object easily and with a high accuracy.

The present invention is a generation apparatus having: an acquisition unit configured to acquire a plurality of pieces of image data obtained by capturing an object from different directions by a plurality of image capturing apparatuses arranged at different positions, respectively; a first derivation unit configured to derive reliability for each of the image capturing apparatuses based on spatial resolution in the image data; and a generation unit configured to generate three-dimensional shape data representing the shape of the object based on the image data and the reliability.

Further features of the present invention will become apparent from the following description of exemplary embodiments with reference to the attached drawings.

DESCRIPTION OF THE EMBODIMENTS

In the following, embodiments of the present invention are explained in detail with reference to the drawings. However, the following embodiments are not intended to limit the present invention and all combinations of features explained in the following are not necessarily indispensable to solve the problem of the present invention. Explanation is given by attaching the same symbol to the same configuration. Further, relative arrangement, shapes, and the like of components described below are merely exemplary and not intended to limit the present invention only to those.

First Embodiment

In the present embodiment, in accordance with the spatial resolution of an object on an image, shape estimation is performed by switching silhouette inside/outside determination conditions in the shape-from-silhouette. According to the present embodiment, by preferentially using the image of an object whose spatial resolution is high, it is possible to estimate a shape with a high accuracy by simple processing. In the following, a case is explained where the format of three-dimensional shape data (hereinafter, referred to as shape data) indicating the shape of an object is a point cloud, however, it is possible to similarly apply the present embodiment to another data format, such as a mesh and a depth map.

<About Image Capturing System>

Figure 1:
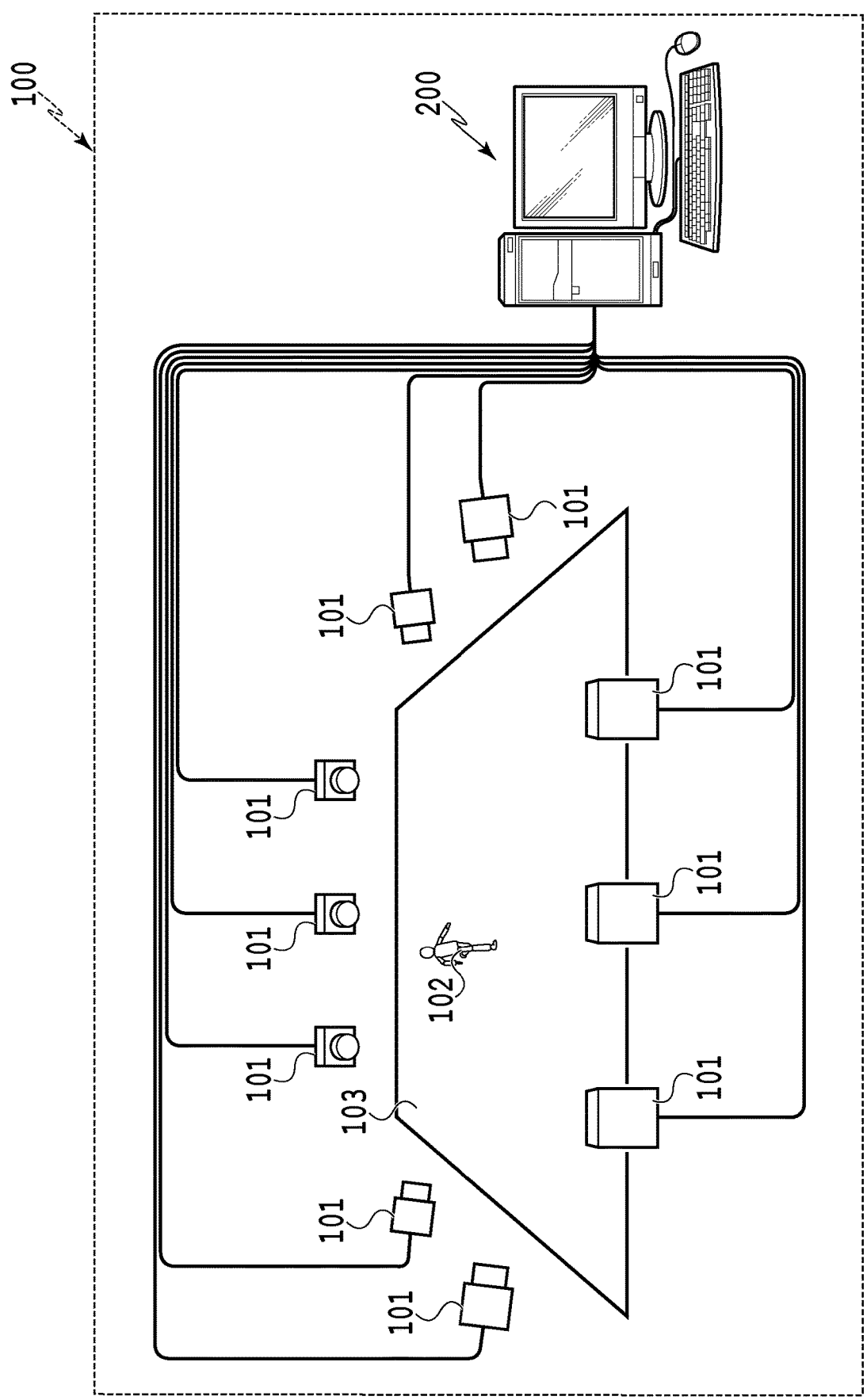
FIG. 1 is an outline configuration diagram of an image capturing system in a first embodiment.

In the following, an image capturing system in the present embodiment is explained by using FIG. 1. FIG. 1 shows an example of an image capturing system in the present embodiment. An image capturing system 100 has a plurality of cameras 101 and an image processing apparatus 200. As shown in FIG. 1, by using the plurality of the cameras 101 arranged so as to surround an object, image capturing of the object is performed. Each of the plurality of the cameras 101 obtains an image group by capturing the object from image capturing positions different from one another. The image capturing position is the position at which the camera is arranged. In the example in FIG. 1, by using the plurality of the cameras 101 arranged in an outdoor or indoor sports arena, a player 102 located on a ground (image capturing field) 103 is captured.

FIG. 1 shows an example of application to a sports scene, but it is possible to apply the present embodiment to image capturing of an object in an arbitrary scene. Further, in the present embodiment, an object normally refers to an object (moving object) that is moving (whose absolute position may change) in a case where image capturing is performed from the same direction in a time series, for example, such as the player 102 or a ball (not shown schematically) in a game in which a ball is used. However, in the present embodiment, it is possible to adopt an arbitrary object specification method and it is also possible to handle a still object, such as a background, as an object. The above is the contents of the image capturing system in the present embodiment.

<About Hardware Configuration of Image Processing Apparatus>

Figure 2:
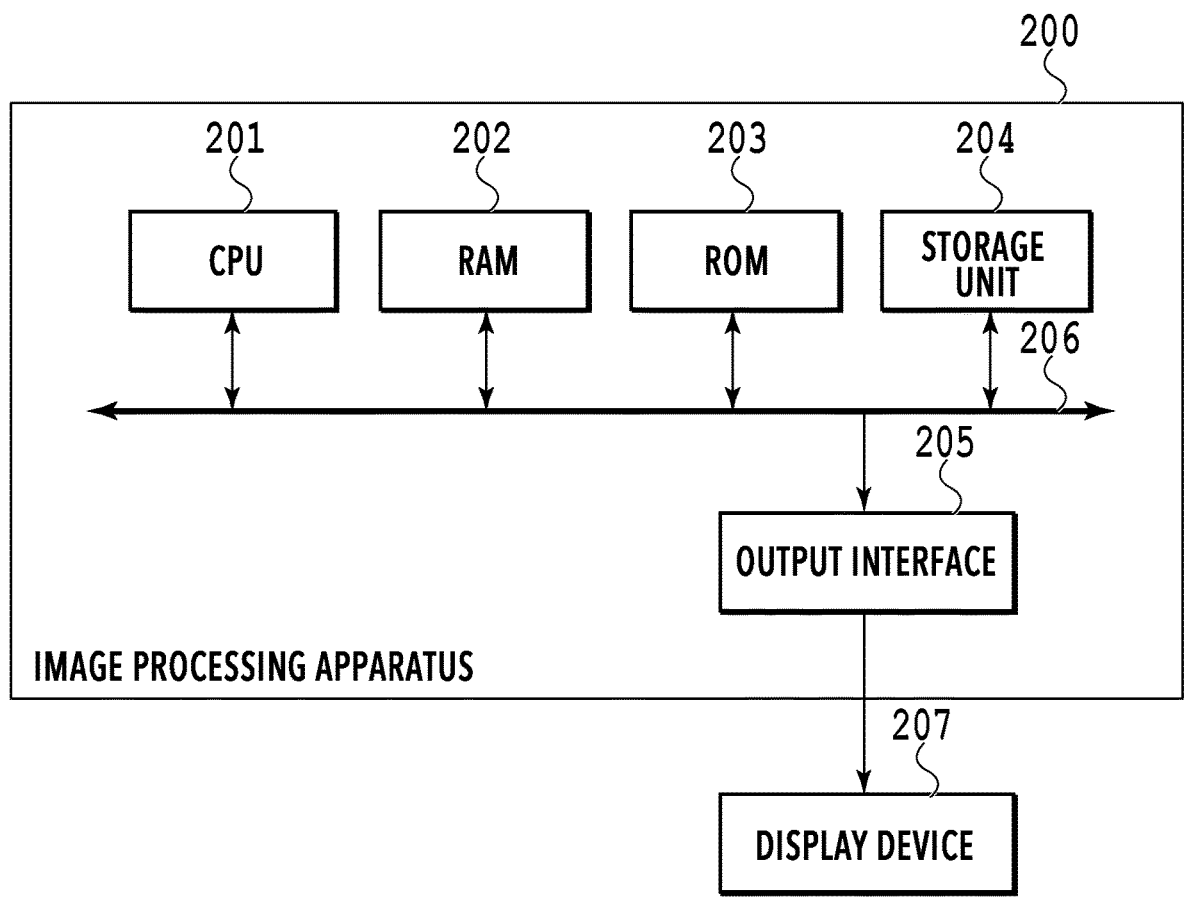
FIG. 2 is a block diagram showing a hardware configuration of an image processing apparatus in the first embodiment.

In the following, a hardware configuration of the image processing apparatus 200 in the present embodiment is explained by using FIG. 2. FIG. 2 is a block diagram showing an example of the hardware configuration of the image processing apparatus 200.

A CPU 201 performs operation control of the entire image processing apparatus 200 and specifically, performs various kinds of processing by using programs and data stored in a memory, such as a RAM 202 or a ROM 203. Due to this, the CPU 201 implements modules (see FIG. 3), to be described later, performs processing (see FIG. 4), to be described later, and so on.

The RAM 202 has an area for storing a program and data loaded from a memory, such as the ROM 203 or a storage unit 204. Further, the RAM 202 has a work area used at the time the CPU 201 performs various kinds of processing. As described above, it is possible for the RAM 202 to provide various areas. The ROM 203 stores setting data that does not need to be rewritten and programs and data necessary at the time of boot.

The storage unit 204 is a storage device that stores programs and data and for example, is a large-capacity information storage device, such as a hard disk drive. It is possible for the storage unit 204 to store an operating system (hereinafter, OS), programs and data for causing the CPU 201 to perform each piece of processing, to be described later. Further, it is possible for the storage unit 204 to store data of a processing-target image or moving image. The programs and data stored in the storage unit 204 become a processing target of the CPU 201 by being loaded onto the RAM 202 in accordance with control by the CPU 201. The storage unit 204 may be a device that reads information from a storage medium, such as CD-ROM or DVD-ROM, or a memory device, such as a flash memory or a USB memory, other than the hard disk drive.

It is possible for the CPU 201 to cause a display device 207 to produce a display by sending display data to the display device 207 connected to an output interface 205 via the output interface 205. In this manner, it is possible for the display device 207 to display processing results by the CPU 201 by using an image and characters, to project the processing results, and so on. As the display device 207, for example, a display device, such as a CRT and a liquid crystal display, or a projection device, such as a projector, is considered.

Each of the CPU 201, the RAM 202, the ROM 203, the storage unit 204, and the output interface 205 is connected to a bus 206 and it is possible to perform communication with one another via the bus 206. The configuration shown in FIG. 2 is merely an example of the configuration of a computer device that can be applied to the image processing apparatus 200. The above is the contents of the hardware configuration of the image processing apparatus 200 in the present embodiment.

<About Shape Data Generation Processing>

Figure 3:
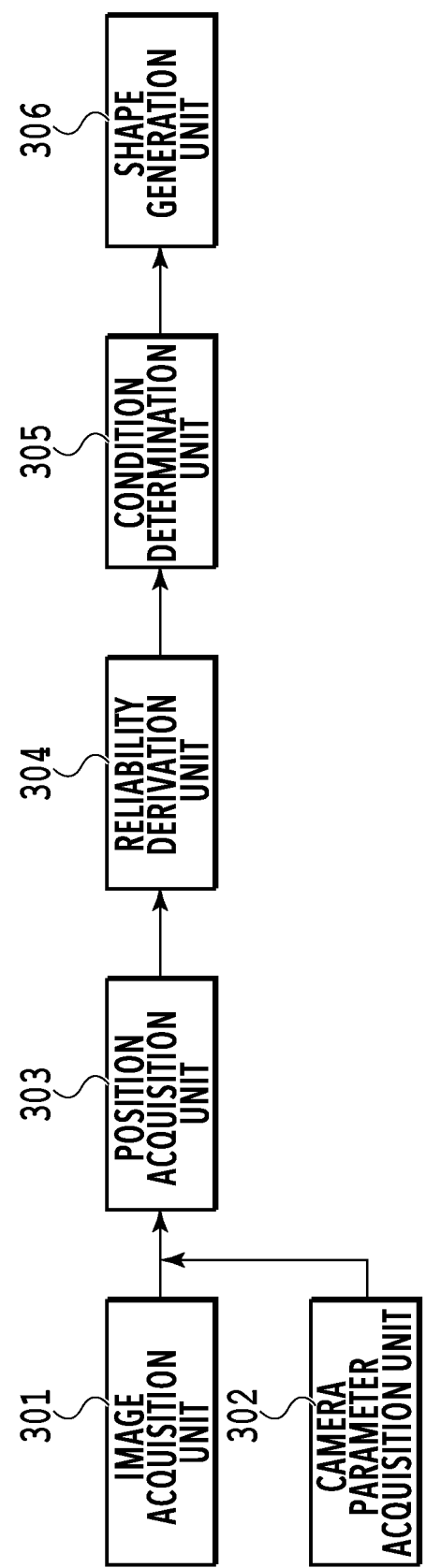
FIG. 3 is a block diagram showing a software configuration of the image processing apparatus in the first embodiment.
Figure 4:
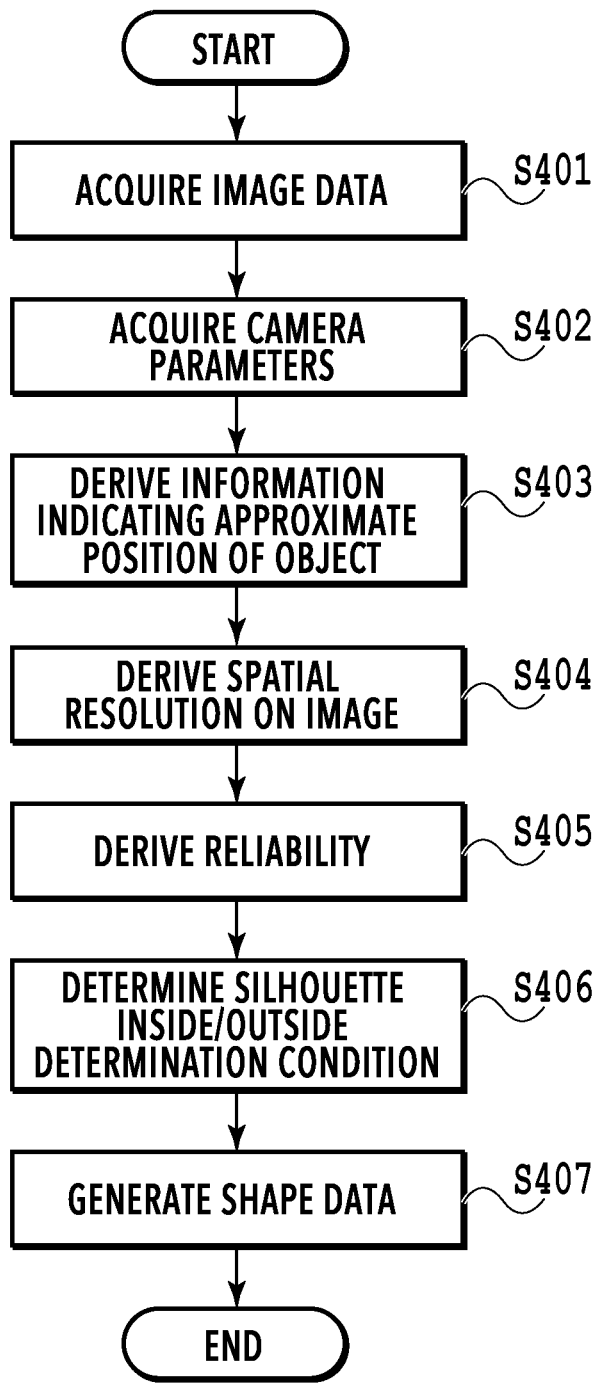
FIG. 4 is a flowchart of shape data generation processing of an object in the first embodiment.

In the following, processing to estimate the shape of an object, which is performed by the image processing apparatus 200 in the present embodiment, in other words, processing to generate shape data of an object (referred to as shape data generation processing) is explained by using FIG. 3 and FIG. 4. FIG. 3 is a block diagram showing an example of a software configuration (function configuration) of the image processing apparatus 200 in the present embodiment and FIG. 4 is a flowchart of the shape data generation processing in the present embodiment.

As shown in FIG. 3, the image processing apparatus 200 in the present embodiment has an image acquisition unit 301, a camera parameter acquisition unit 302, a position acquisition unit 303, a reliability derivation unit 304, a condition determination unit 305, and a shape generation unit 306. It is possible for the CPU 201 of the image processing apparatus 200 to implement each of the modules described above by loading a program stored within the ROM 203 or the storage unit 204 on the RAM 202 and executing the loaded program. It may also be possible for the image processing apparatus 200 to have a dedicated processing circuit corresponding to one or more modules of the modules shown in FIG. 3.

In the following, a flow of the shape data generation processing performed by the modules shown in FIG. 3 is explained by using FIG. 4.

At step S401, the image acquisition unit 301 acquires a silhouette image group of an object corresponding to a plurality of different image capturing positions. In the following, "step S-" is simply abbreviated to "S-". The silhouette image is a digital image, a so-called binary image, in which each pixel can take only two kinds of value and for example, the pixel value in an area in which an object exists is 255 and the pixel value in an area in which no object exists is 0. The silhouette image, which is a digital image, is also called silhouette image data.

It is possible for the image acquisition unit 301 to acquire a silhouette image from the storage unit 204, which is generated based on images captured from directions different from one another for each of the plurality of the cameras 101. In a case where it is possible for the camera 101 to generate silhouette image data, it may also be possible for the image acquisition unit 301 to acquire silhouette image data directly from the camera 101. Further, it is possible for the image acquisition unit 301 to acquire a still image group obtained substantially at the same time by the plurality of the cameras 101. Furthermore, it is also possible for the image acquisition unit 301 to acquire a moving image group captured from a plurality of different positions. For example, it is possible for the image acquisition unit 301 to acquire a frame image group captured substantially at the same time from the moving images obtained by the plurality of the cameras 101.

At S402, the camera parameter acquisition unit 302 acquires camera parameters of each of the plurality of the cameras 101. The camera parameters include internal parameters, external parameters, and distortion parameters. The internal parameters may include at least one of the coordinate values of the image center and the focal length of the camera lens. The external parameters are parameters indicating the position and orientation of the camera. In the present specification, as the external parameters, the position vector and the rotation matrix of the camera in the world coordinate are used, but it may also be possible to use external parameters that describe the position and orientation of the camera by another method. The distortion parameters indicate distortion of the camera lens. Based on the camera parameters as described above, it is possible to obtain the position of the camera having captured the object and the direction from the camera toward the object corresponding to each pixel of the image.

The camera parameter acquisition unit is not limited in particular. For example, the camera parameters may be stored in advance in the storage unit 204. Further, it is also possible to obtain the camera parameters by performing estimation using the structure from motion method based on image data from a plurality of viewpoints and to obtain the camera parameters by performing calibration using a chart or the like.

At S403, the position acquisition unit 303 derives three-dimensional coordinates of a point or a voxel representative of the object as information indicating the approximate position of the object. As a point representative of the object, it is possible to use the position of the center of gravity of the object or a part of vertexes of a bounding box including the object. As a specific method of deriving the approximate position of the object, mention is made of, for example, the shape-from-silhouette using voxels whose resolution is low. Further, it is also possible to perform distance estimation in which object recognition is performed and the stereo matching method is used for a part of the recognized object. In addition, it is also possible to use another publicly known method for acquiring a rough distance to the object. By this step, the position acquisition unit 303 acquires the approximate distance form the camera 101 to the object.

At S404, the reliability derivation unit 304 derives spatial resolution of the object in the image for each of the plurality of the cameras 101.

At S405, the reliability derivation unit 304 derives reliability based on the spatial resolution derived at S404. The method of deriving spatial resolution and reliability at S404 and S405 will be described later by using FIG. 5A and FIG. 5B.

At S406, the condition determination unit 305 determines a condition (referred to as silhouette inside/outside determination condition) used at the time of determining whether or not the result of projecting the voxel falls within the silhouette based on the reliability derived at S405. At the time of determining the silhouette inside/outside determination condition, it may also be possible to acquire a threshold value determined in advance from a storage medium, such as the storage unit 204, or to acquire from the outside of the image processing apparatus 200. The method of determining the silhouette inside/outside determination condition at this step will be described later by using FIG. 6.

At S407, the shape generation unit 306 generates shape data by the same method as the shape-from-silhouette based on the condition determined at S406 by using the silhouette image group. The shape-from-silhouette used at this step is publicly known as disclosed in Japanese Patent Laid-Open No. 2011-43879, and therefore, detailed explanation is omitted. The above is the contents of the shape data generation processing performed by the image processing apparatus 200.

<Derivation Method of Reliability>

Figure 5A:
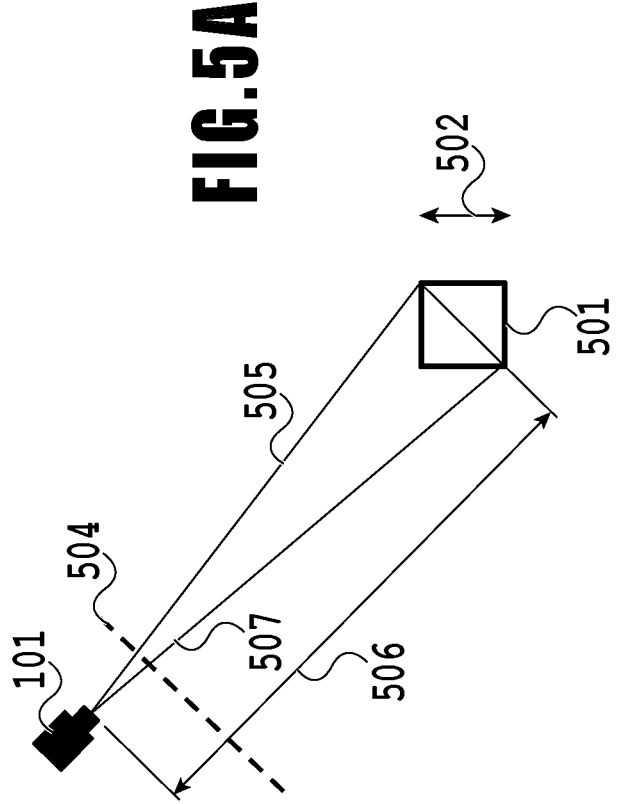
FIG. 5A and FIG. 5B are conceptual diagrams explaining a derivation method of reliability in the first embodiment.
Figure 5B:
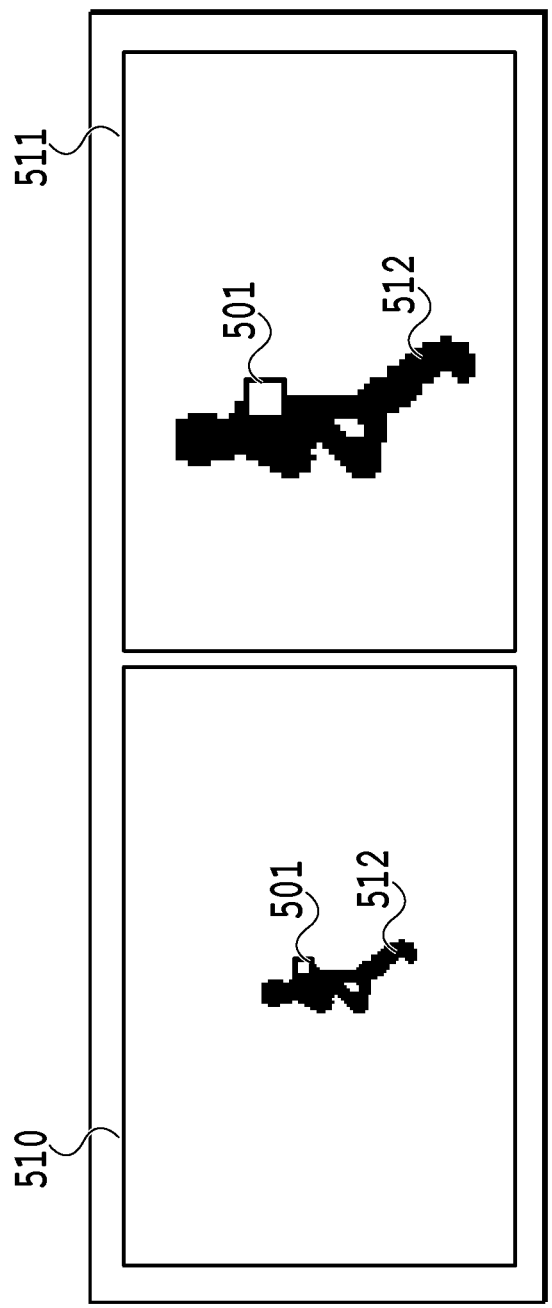

In the following, the derivation method of reliability in the present embodiment is explained by using FIG. 5A and FIG. 5B. FIG. 5A and FIG. 5B show a position relationship between a voxel 501 set in a three-dimensional space and the camera 101. Reliability indicates a degree in which in a case where a voxel that is set in the three-dimensional space is projected onto the image plane of the camera, the object represented by the voxel on the three-dimensional space and the object represented by the pixel corresponding to the voxel on the captured image of the camera coincide with each other.

In the following explanation, the three-dimensional space in which an object exists is represented discretely by using voxels. That is, the target three-dimensional space is partitioned by voxels, each of which is a regular grid whose side has a length of $\Delta$ [mm]. It is possible to represent the coordinates of each voxel by using a grid vector, for example, such as (x-coordinate, y-coordinate, z-coordinate) =(0, 0, 0), (1, 0, 0), (3, 0, 1) . . . . It is possible to obtain the actual physical position within the three-dimensional space corresponding to a voxel by multiplying the grid vector such as this by the size $\Delta$ of the regular grid. As $\Delta$, for example, it is possible to adopt a value, such as 5 mm.

FIG. 5A shows the way the voxel 501 of a predetermined size is projected onto the camera 101. A line 506 indicates a distance z [mm] along the optical axis direction of the camera 101 from the center of the voxel 501 to the camera 101. A line 505 and a line 507 are lines that project the end portions of the voxel 501 onto the camera 101. A line 502 indicates the length $\Delta$ of one side of the voxel. A surface 504 is an image plane of the camera 101, in other words, a projection surface of a captured image obtained by the camera 101. In the following, it is assumed that the focal length of the camera 101 represented in units of pixels is f [pix].

At the time of projecting the voxel 501 onto the camera 101, the voxel 501 viewed from the camera 101 becomes largest in a case where the longest diagonal line ($\sqrt{3}\Delta$ in length) of the voxel 501 intersects with the optical axis of the camera 101 at right angles. In this case, the size of the voxel 501 on the image is represented by a pixel width d [pix] in accordance with equation (1) below.

$$d=\sqrt{3}(f\Delta/z) \qquad \text{equation (1)}$$

In other words, in a case where the length of one side of the voxel is $\Delta$, the spatial resolution of the object on the image is represented approximately by d [pix]. Here, by taking into consideration a case where the resolution of the object becomes lowest, the pixel width d is calculated by using the longest diagonal line ($\sqrt{3}\Delta$ in length) of the voxel. However, it is also possible to calculate the pixel width d by using, in place of the longest diagonal line, the diagonal line ($\sqrt{2}\Delta$ in length) of the surface of the voxel, specifically, the square, or by using one side ($\Delta$ in length) of the voxel.

FIG. 5B shows the way the voxel 501 is projected in a case where an object 512 is captured in an image 510 and an image 511. The voxel 501 is displayed large for convenience of illustration. The image 510 shows a case where d calculated by using equation (1) is small (for example, one pixel) and on the other hand, the image 511 shows a case where d calculated by using equation (1) is large (for example, five pixels). In a case where the distance between the camera 101 and the object 512 is long or in a case where the camera 101 is a wide-angle one, the image captured by the camera 101 is an image in which the ratio accounted for by the object boundary within the projected voxel is large, as shown in the image 510. On the other hand, in a case where the distance between the camera 101 and the object 512 is short or in a case where the camera 101 is a telephoto one, the image captured by the camera 101 is an image in which the ratio accounted for by the object boundary within the projected voxel is small, as shown in the image 511.

In the image 510, d is small, and therefore, it cannot be said that the object boundary is resolved for the desired spatial resolution $\Delta$ [mm]. Because of this, the reliability of the object boundary is low. On the other hand, in the image 511, d is large, and therefore, the object boundary is resolved sufficiently, and the reliability of the object boundary is high.

With those in mind, in the following, reliability is derived by using the value of d. However, it may also be possible to apply the present embodiment in a case where the value of d itself is used as reliability. As one implementation aspect of the shape-from-silhouette, Space Carving Method (hereinafter, SCM) is known. In the following, the principle of shape restoration by the SCM is explained by using FIG. 6.

Figure 6:
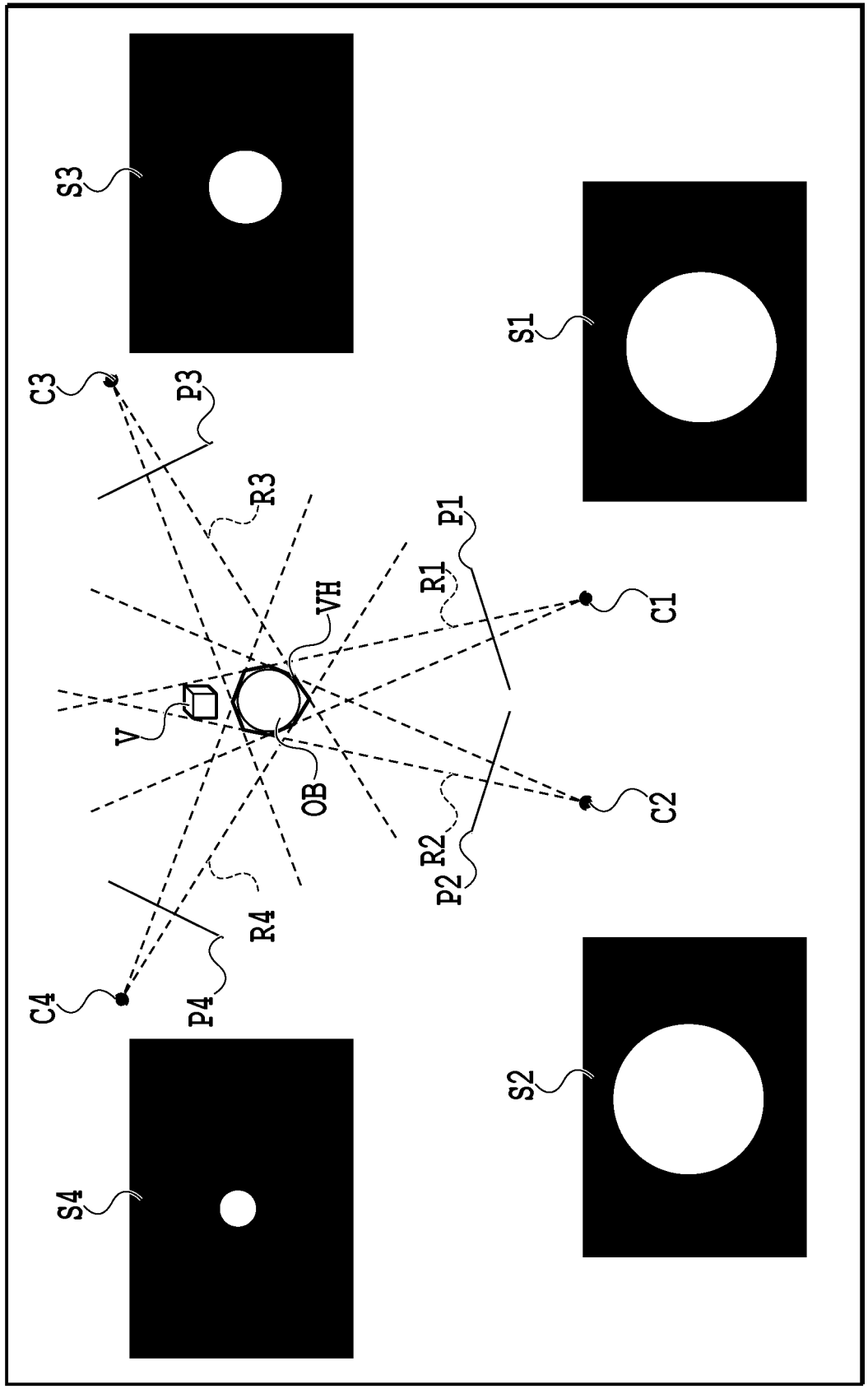
FIG. 6 a conceptual diagram of processing performed by a condition determination unit 305 and a shape generation unit 306 in the first embodiment.

FIG. 6. shows the way an object OB is captured by four cameras arranged so as to surround the object OB. Symbols C1 to C4 in FIG. 6 each indicate the camera center and symbols P1 to P4 each indicate the camera image plane. Symbols R1 to R4 each indicate the ray of light from the object OB toward each of the camera centers C1 to C4. Symbols S1 to S4 each indicate a schematic diagram of a silhouette image in a case where the object OB is projected onto each of the image planes P1 to P4 of the object OB. Here, it is assumed that the object OB is a sphere.

In the SCM, attention is focused on one of voxels existing within a range determined in advance, specifically, within a bounding box (this voxel is referred to as voxel of interest). Whether or not the projection of the voxel of interest (referred to as voxel V) is included within the silhouettes (areas including pixels whose pixel value is 255) of the silhouette images S1 to S4 in a case where the voxel V is projected onto the image planes P1 to P4 is determined. In a case where results of the determination indicate that at least one camera exists, for which the projection of the voxel V is not included within the silhouette, the voxel V is deleted. On the other hand, in a case where the projection of the voxel V is included inside the silhouette in all the silhouette images S1 to S4, the voxel V is left as a voxel configuring the object OB. By performing this series of processing for all the voxels within the bounding box, a visual hull (abbreviated to VH), which is a set of linked convex voxels, is generated. The above is the principle of shape restoration by the SCM.

In the following, the operation of the condition determination unit 305 configured to determine the silhouette inside/outside determination condition in the present embodiment is described. It is assumed that in FIG. 6, the reliability of the silhouette boundary in each of the silhouette images S1 to S4 is derived by using the value of d calculated by equation (1) as described previously. Here, a case is considered where for each of the silhouette images S1 and S2, d is calculated as d=5 [pix], for the silhouette image S3, d is calculated as d=1.5 [pix], and for the silhouette image S4, d is calculated as d=0.5 [pix]. In a case where the value of d is larger than or equal to d_th for a threshold value d_th=2 [pix], reliability is taken to be "high" and on the other hand, in a case where the value of d is smaller than d_th, reliability is taken to be "low". In a case of FIG. 6, the reliability of the silhouette images S1 and S2 is "high" and the reliability of the silhouette images S3 and S4 is "low". The condition determination unit 305 changes the condition to leave the voxel V by the SCM in accordance with reliability. In the following, explanation is given only to the camera for which the voxel V is included within the angle of view.

For the silhouette image group whose reliability is "high" (referred to as S_high), only in a case where the voxel V is projected onto the image plane and the projection of the voxel V is included in all the silhouette image groups S_high, the voxel V is left. The reason is that the spatial resolution of the silhouette boundary is sufficiently high and the probability that the voxel V belonging to the object OB is outside the silhouette is low.

For the silhouette image group whose reliability is "low" (referred to as S_low), only in a case where the voxel V is projected onto the image plane and the number of viewpoints from which the projection of the voxel V is outside the silhouette is smaller than or equal to a predetermined threshold value m, the voxel V is left. For example, in a case where there are five silhouette images whose reliability is "low" and m=1, on a condition that the projection of the voxel V is included within the silhouette for the four silhouette images out of the five silhouette images, the voxel V is left.

As above, a case is explained where the silhouette inside/outside determination condition at the time of shape estimation using the silhouette image group S_low whose reliability is "low" is relaxed, but, it may also be possible not to use the silhouette image group S_low whose reliability is "low" from the beginning. However, even in such a case, for the object that is captured only in an image captured by the camera whose reliability is "low", shape estimation using the silhouette image group whose reliability is "low" is performed. As the condition of the inside/outside determination, it is assumed that even in a case where the projection of the voxel is outside the silhouette image at the viewpoint at m' portions, that is, at the image capturing position at the m' portions, this is accepted. It may be possible for m' to be equal to m or to be different from m. For example, it is possible to set m' to 2 (m'=2).

Here, the case is explained where reliability takes values at two levels, but reliability may take values at levels more than two levels. For example, it is also possible to set three levels stepwise, such as "high", "middle", and "low". Further, it may also be possible to derive the number m of viewpoints at which the projection may be outside the silhouette by using a function to which the pixel width d is input or a table holding a correspondence relationship between m and d.

<About Effect of the Present Embodiment>

According to the present embodiment, by deriving reliability in accordance with the magnitude of spatial resolution in a captured image and preferentially using an image acquired by a camera whose spatial resolution is high based on the derived reliability, it is made possible to estimate the shape of an object with a high accuracy.

Second Embodiment

In the present embodiment, shape estimation is performed by a method of obtaining three-dimensional information from two-dimensional images at a plurality of viewpoints (so-called multiple viewpoint stereo matching) by using consistency of color information. In the following, differences from the already-described embodiment are explained mainly and explanation of the same contents as those of the already-described embodiment is omitted appropriately.

In the present embodiment, it may also be possible to use a silhouette image in an auxiliary manner as in the case with the first embodiment, but basically, color information on a captured image is used. In the following, a case is explained where as an evaluation value of matching using color information, the normalized cross-correlation (hereinafter, NCC) is adopted.

In the NCC, the RGB value of a patch including the neighborhood of a target point is turned into a vector and the degree of matching is evaluated by correlating vectors with each other. As the evaluation value of matching, SSD (Sum of Squared Differences), SAD (Sum of Absolute Differences), or the like may be used, or another evaluation value may be used. In the multiple viewpoint stereo matching, the point at which the evaluation value of matching is the maximum (or minimum) is estimated as the point on the surface of an object.

<About Shape Data Generation Processing>

Figure 7:
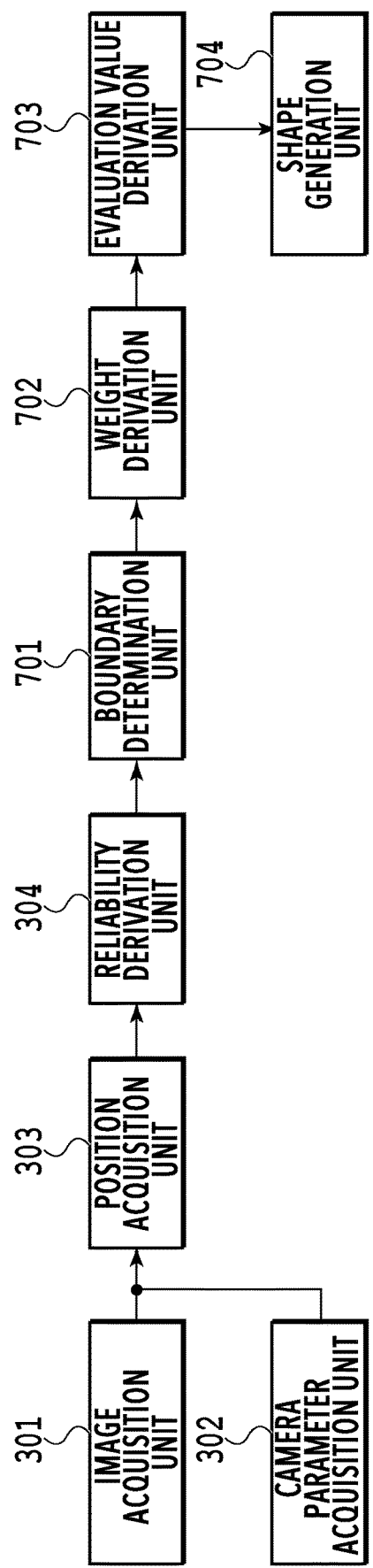
FIG. 7 is a block diagram showing a software configuration of an image processing apparatus in a second embodiment.

In the following, the shape data generation processing performed by the image processing apparatus 200 in the present embodiment is explained by using FIG. 7 and FIG. 8. FIG. 7 is a block diagram showing an example of a software configuration (function configuration) of the image processing apparatus 200 in the present embodiment and FIG. 8 is a flowchart of the shape data generation processing in the present embodiment.

Figure 8:
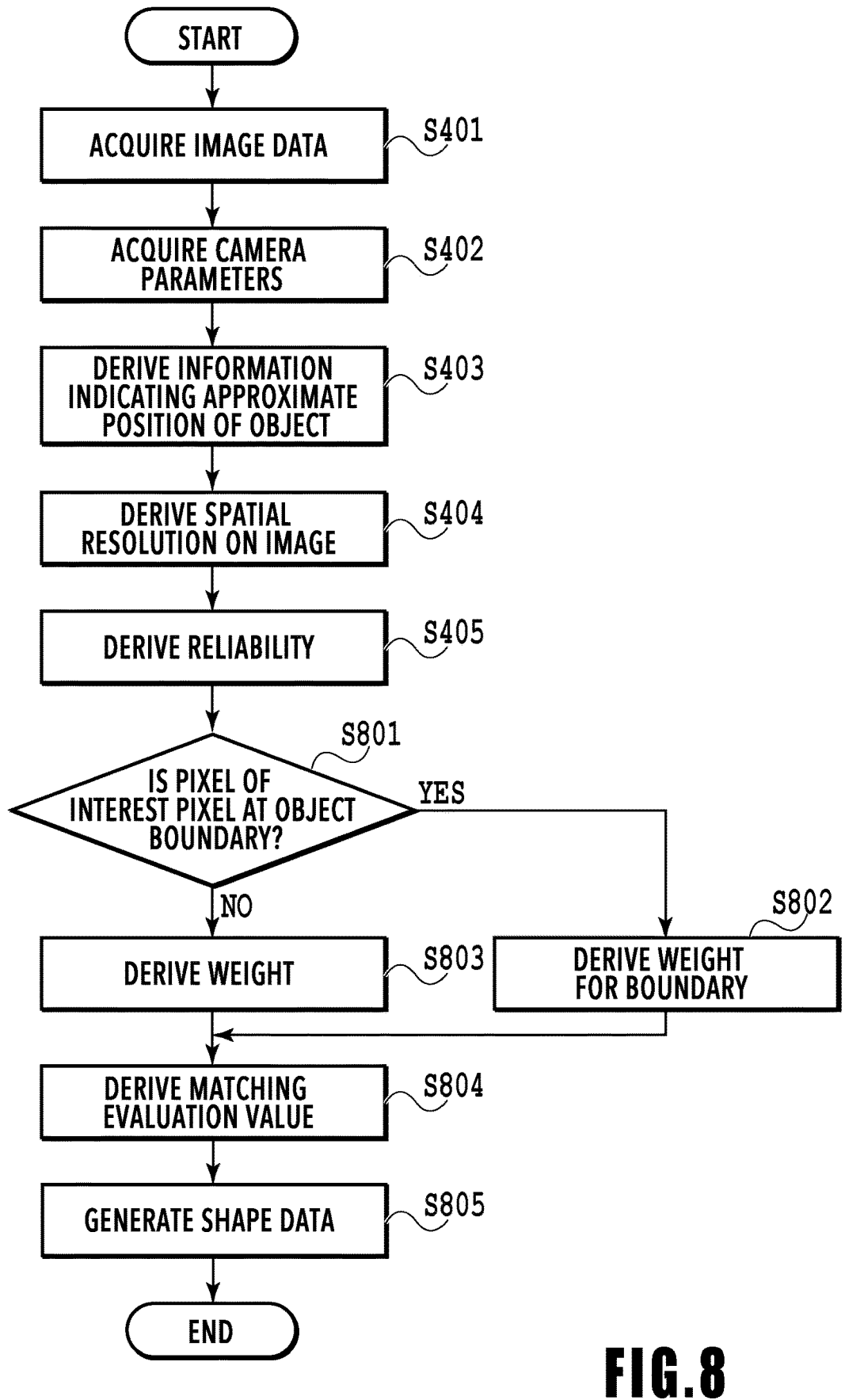
FIG. 8 is a flowchart of shape data generation processing of an object in the second embodiment.

Processing at S401 to S402 in FIG. 8 is the same as that in the first embodiment (see FIG. 4).

At S801, a boundary determination unit 701 determines whether the pixel of interest is a pixel at the object boundary. In a case where determination results at this step are affirmative, the processing advances to S802 and on the other hand, in a case where the determination results are negative, the processing advances to S803. It may also be possible to perform the determination of whether or not the pixel of interest is a pixel at the object boundary at this step based on a silhouette image. Further, it may also be possible to perform the determination by an already-existing edge detection method, such as the Harris corner detection, in a captured image. Alternatively, it may also be possible to detect an edge after detecting the object by an arbitrary object detection method. The processing at S801 to S805 is performed for each pixel of the image at each image capturing position.

At S802, a weight derivation unit 702 derives a weight for a boundary for each camera based on the spatial resolution derived in the first embodiment.

At S803, the weight derivation unit 702 derives a weight (not for a boundary) for each camera based on the spatial resolution derived in the first embodiment.

At S804, an evaluation value derivation unit 703 derives a matching evaluation value based on the weight derived at S802 or S803. Details of the derivation method of a weight and a matching evaluation value at S802 to S804 will be described later.

At S805, a shape generation unit 704 generates shape data of an object based on the matching evaluation value derived at S804. The above is the contents of the shape data generation processing in the present embodiment.

<About Derivation Method of Weight and Matching Evaluation Value>

In the following, a case is explained where a weight is calculated based on the spatial resolution used in the first embodiment. It may also be possible to calculate a weight by using another parameter in place of the spatial resolution. It is possible to calculate a weight by using, for example, equation (2) below.

$$w_n = \alpha d_n \quad \text{equation (2)}$$

In equation (2), $w_n$ indicates a weight for the nth camera, $d_n$ is the spatial resolution calculated by equation (1) and indicates the length of one side in the square corresponding to one voxel in a case where the one voxel is projected onto the nth camera. The equation to calculate the weight $w_n$ is not limited to equation (2) and it may also be possible to use another equation in which the weight $w_n$ increases monotonically for the spatial resolution $d_n$ (or reliability). Then, a is determined so that the sum of the weight Win of all the cameras will be 1. Further, as the matching evaluation value, one obtained by multiplying the NCC of each camera by the weight $w_n$ and calculating an average thereof is adopted.

At the object boundary portion, by defining the weight so that the image acquired by the camera whose spatial resolution (or reliability) is high is used preferentially, it is possible to improve the accuracy of the object boundary. For example, the weight is defined as equation (3).

$$w'_n = \beta d_n^2 \quad \text{equation (3)}$$

Here, β in equation (3) is determined so that the sum of the weight $w'_n$ of all the cameras will be 1 as in the case with α in equation (2). The equation to calculate the weight is not limited to equation (3) and it may also be possible to use another equation as long as the equation is a function whose rate of increase for the spatial resolution is high compared to equation (2). Further, it may also be possible for the image processing apparatus 200 to have in advance a table holding a relationship between the spatial resolution (or reliability) and the weight and to derive a weight and a matching evaluation value by using this table. Furthermore, it may also be possible not to use the camera whose weight is less than a threshold value determined in advance for shape estimation.

<About Effect of the Present Embodiment>

According to the present embodiment, the weight and the matching evaluation value are derived based on the spatial resolution or reliability in the captured image. Due to this, it is made possible to preferentially use the image acquired by the camera whose spatial resolution is high, and therefore, it is made possible to estimate the shape of an object with a high accuracy. It may also be possible to use the present embodiment in combination with the other embodiment of the present invention.

Third Embodiment

In the present embodiment, reliability that is used in each camera is derived in advance.

<About Concept of Processing in the Present Embodiment>

Figure 9A:
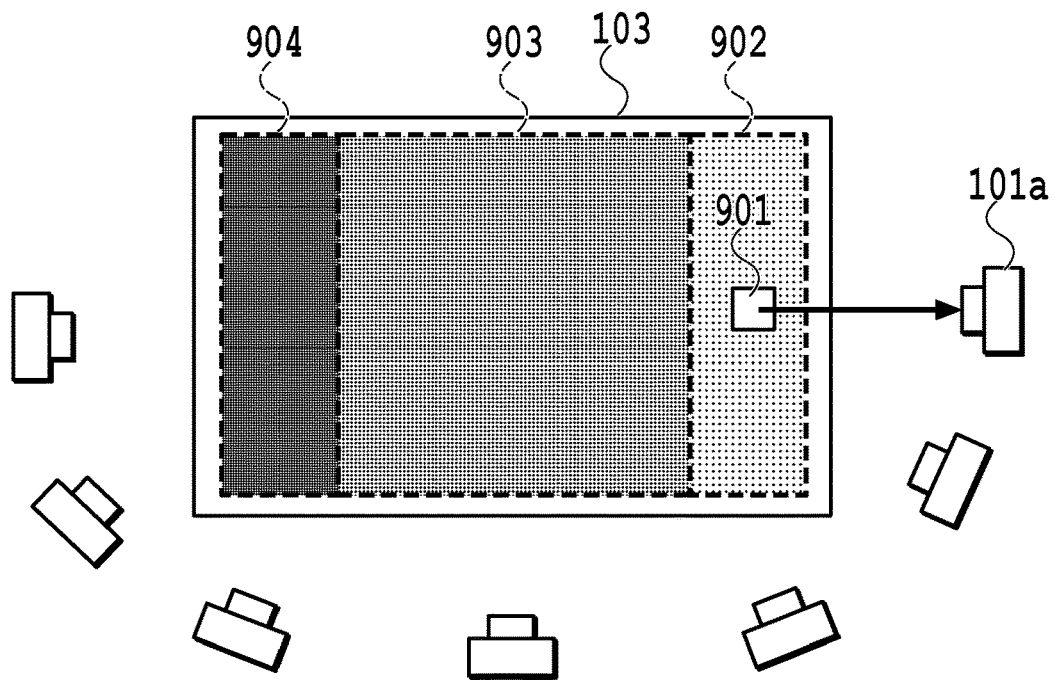
FIG. 9A and FIG. 9B are conceptual diagrams of processing in a third embodiment.

In the following, the concept of processing in the present embodiment is explained by using FIG. 9A and FIG. 9B. FIG. 9A is a diagram in a case where the area of the ground (image capturing field), that is, the ground 103 is viewed from directly above. In the present embodiment, the ground 103 is divided into small areas and reliability for each camera is derived in advance for each of the divided small areas. As the small area, for example, it is possible to take a square whose one side is 50 cm long.

FIG. 9A shows the results of dividing the ground 103 into small areas and deriving reliability of each area by projecting a representative voxel included in each small area as in the case with the first and second embodiments. Symbol 901 in FIG. 9A indicates one of a plurality of small areas. For convenience of illustration, the other small areas are omitted. The representative position of the voxel in the small area may be any position as long as the position is within the small area, and here, the center of the voxel is taken to be the representative position. As shown schematically, for the camera 101a, the reliability of an area 902 is "high", the reliability of an area 903 is "middle", and the reliability of an area 904 is "low".

Figure 9B:
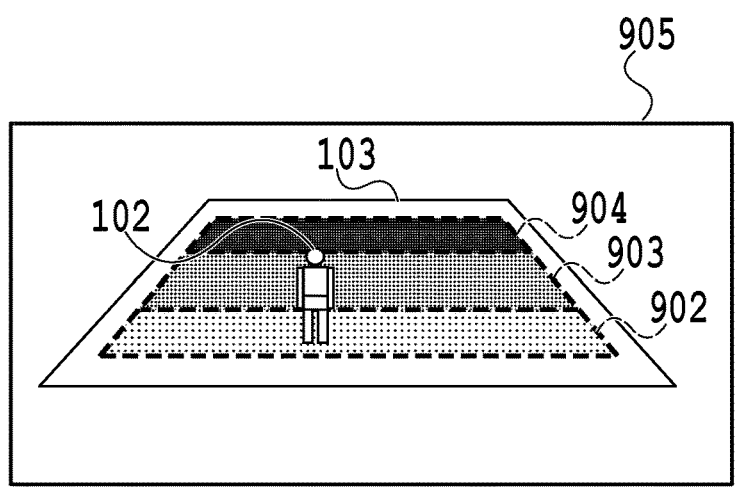

FIG. 9B shows a position relationship between the player 102, the around 103, and the areas 902 to 904 in a captured image 905 of the camera 101a. In the captured image 905, an area in which an object exists is derived and reliability corresponding to the derived area is taken to be the reliability of the object. In the example in FIG. 9B, the player 102 stands in the area 902, and therefore, the reliability of the player 102 is taken to be the reliability of the area 902, that is, "high". Here, the case is explained where reliability takes values at three levels, but reliability may take values at levels more than three levels, or may take values at two levels. Further, it may also be possible for the image processing apparatus 200 to have a table in advance holding a correspondence relationship between each area and reliability and to derive reliability by using the table. Further, it is possible to use the present embodiment alone, or to use the present embodiment in combination with the other embodiments of the present invention.

<About Effect of the Present Embodiment>

According to the present embodiment, by deriving reliability in advance, it is made possible to estimate the shape of an object with a high accuracy without increasing the operation amount. It may also be possible to use the present embodiment in combination with the other embodiments of the present invention.

Fourth Embodiment

In the first embodiment and the second embodiment, the case is explained where the contribution ratio of a camera whose spatial resolution is low to shape estimation is reduced and in the present embodiment, the contribution ratio of a camera that is used for shape estimation is determined by also taking into consideration the camera arrangement.

<About Concept of Processing in the Present Embodiment>

Figure 10:
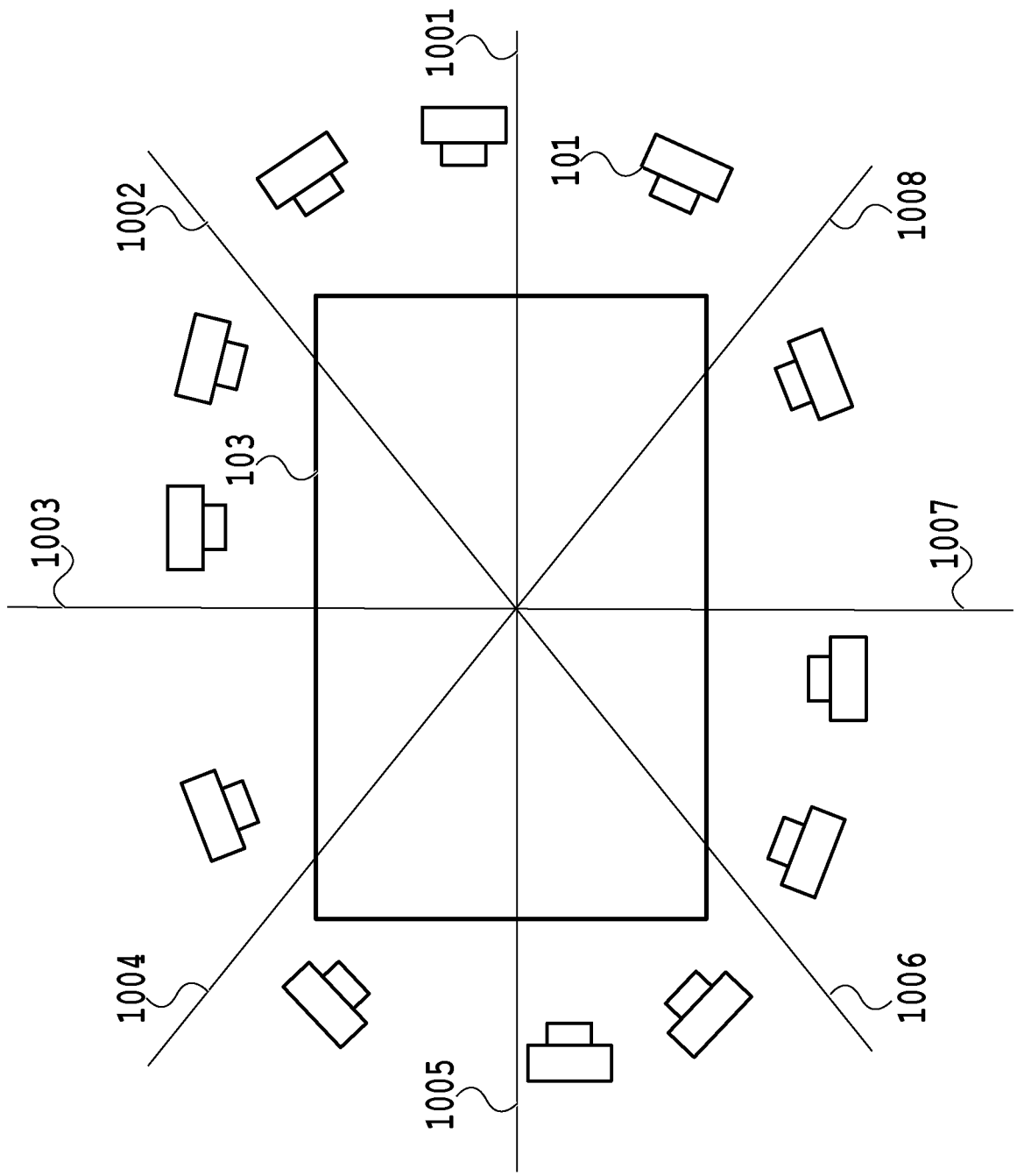
FIG. 10 is a conceptual diagram of processing in a fourth embodiment.

In the following, the concept of processing in the present embodiment is explained by using FIG. 10. FIG. 10 shows an example in which the plurality of the cameras 101 is divided into eight groups. In FIG. 10, half lines 1001 to 1008 extending from the origin as the start point are lines dividing the camera group into eight groups and a set of cameras surrounded by the half lines adjacent to each other is taken as one group. For example, in a case where the spatial resolution of all the cameras in the camera group surrounded by the half line 1001 and the half line 1002 is low, reliability for those cameras is set low and as a result of this, the contribution ratio of those cameras to shape estimation decreases. Consequently, in the case such as this, information viewed from a specific direction is lost and this may lead to a reduction in shape estimation accuracy.

Consequently, in the present embodiment, the weight is determined for each camera, or the camera to be used is determined so that at least one camera is used for shape estimation in each group.

For example, a case is discussed where a camera whose reliability is low is not used for shape estimation. In this case, on a condition that the spatial resolution for all the cameras belonging to a certain group is smaller than a predetermined threshold value, reliability for at least one camera is set high so that the at least one camera of the cameras belonging to the group is used for shape estimation.

As another example, a case is discussed where the weight is derived based on reliability. In this case, on a condition that all the weights of the cameras belonging to a certain group are lower than a threshold value w_th, it is sufficient to increase the weight of at least one camera within the group to w_th. The method that can be adopted in the present embodiment is not limited to this and another method may be adopted as long as the method does not cause unevenness in the distribution of the cameras that are used for shape estimation. Further, it is possible to use the present embodiment in combination with the other embodiments. The above is the contents of the concept of the processing in the present embodiment.

<About Effect of the Present Embodiment>

According to the present embodiment, it is made possible to estimate the shape of an object with a high accuracy by performing shape estimation by preferentially using the camera whose spatial resolution is high while preventing the occurrence of unevenness in the distribution of the cameras that are used for shape estimation. Note that the present embodiment may be used in combination with other embodiments of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to estimate the shape of an object easily and with a high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-124702, filed Jun. 29, 2018, which is hereby incorporated by reference wherein in its entirety.

What is claimed is:

1. A generation apparatus comprising:
one or more memories storing instructions; and
one or more processors that implement the instructions to:
acquire a plurality of images obtained by capturing an object from different directions by a plurality of image capturing apparatuses arranged at different positions, respectively;
determine reliability of each of the plurality of image capturing apparatuses based on a spatial resolution in the acquired plurality of images, the spatial resolution being determined based on a width of a region corresponding to an element forming three-dimensional shape data in a state where the element is projected onto an image plane of the respective image capturing apparatus; and generate three-dimensional shape data representing a shape of the object based on the acquired plurality of images and the determined reliability.

2. The generation apparatus according to claim 1, wherein the one or more processors generate the three-dimensional shape data based on the plurality of images obtained by an image capturing apparatus, among the plurality of image capturing apparatuses, whose reliability is higher than reliability of another image capturing apparatus, among the plurality of image capturing apparatuses.

3. The generation apparatus according to claim 1, wherein the one or more processors implements the instructions to determine the spatial resolution by calculating a width of a pixel in the state where, the element is projected onto the image plane of the respective image capturing apparatus.

4. The generation apparatus according to claim 1, wherein the one or more processors determine the reliability based on a value that changes in accordance with the spatial resolution.

5. The generation apparatus according to claim 1, wherein the one or more processors determine the reliability based on one of values that change stepwise in accordance with the spatial resolution.

6. The generation apparatus according to claim 1, wherein:
the element is a voxel, and
the one or more processors generate the three-dimensional shape data of the object by repeating processing to determine whether a voxel of interest is a voxel belonging to the object within a range surrounding the object and leaving only voxels belonging to the object.

7. The generation apparatus according to claim 1, wherein the acquired plurality of images include a silhouette image that is a binary image representing a silhouette of the object.

8. The generation apparatus according to claim 7, wherein the one or more processors generate the three-dimensional shape data of the object based on the silhouette image, which is acquired by an image capturing apparatus, among the plurality of image capturing apparatuses, whose reliability is higher than reliability of another image capturing apparatus, among the plurality of image capturing apparatuses.

9. The generation apparatus according to claim 7, the one or more processors implement the instructions to determine a determination condition for determining whether the voxel of interest is a voxel belonging to the object.

10. The generation apparatus according to claim 9, wherein the determination condition changes in accordance with the determined reliability.

11. The generation apparatus according to claim 10, wherein the determination condition is:
a projection of the voxel of interest included within the silhouette in all the silhouette images in a case where the determined reliability is a first value; and
a projection of the voxel of the interest included within the silhouette in part of the silhouette images in a case where the determined reliability is a second value that is lower than the first value.

12. The generation apparatus according to claim 4, the one or more processors implement the instructions to determine a weight and a matching evaluation value used in multiple viewpoint stereo matching based on the spatial resolution or the determined reliability.

13. The generation apparatus according to claim 12, wherein a weight for an image capturing apparatus, among the plurality of image capturing apparatuses, whose reliability is determined to be at a first value is higher than a weight for another image capturing apparatus, among the plurality of image capturing apparatuses, whose reliability is determined to be lower than the first value.

14. The generation apparatus according to claim 1, wherein the one or more processors determine the reliability so as not to cause unevenness to occur in a distribution of an image capturing apparatus, among the plurality of image capturing apparatuses, whose reliability is lower than a first predetermined value based on arrangement of the plurality of image capturing apparatuses whose spatial resolution is lower than a second predetermined value.

15. The generation apparatus according to claim 1, the one or more processors implement the instructions to cause the one or more memories to store a relationship between an area corresponding to an image capturing field classified in a captured image and the reliability for each of the plurality of image capturing apparatuses.

16. The generation apparatus according to claim 15, wherein the one or more processors determine the reliability based on areas corresponding to the classified image capturing fields the object is located in.

17. A method comprising:
acquiring a plurality of images obtained by capturing an object from different directions by a plurality of image capturing apparatuses arranged at different positions, respectively;
determining reliability of each of the plurality of image capturing apparatuses based on a spatial resolution in the acquired plurality of images, the spatial resolution being determined based on a width of a region corresponding to an element forming three-dimensional shape data in a state where the element is projected onto an image plane of the respective image capturing apparatus; and
generating three-dimensional shape data representing a shape of the object based on the acquired plurality of images and the determined reliability.

18. A non-transitory computer readable storage medium storing a program executable by a computer to perform a method comprising:
acquiring a plurality of images obtained by capturing an object from different directions by a plurality of image capturing apparatuses arranged at different positions, respectively;
determining reliability of each of the plurality of image capturing apparatuses based on a spatial resolution in the acquired plurality of images, the spatial resolution being determined based on a width of a region corresponding to an element forming three-dimensional shape data in a state where the element is projected onto an image plane of the respective image capturing apparatus; and
generating three-dimensional shape data representing a shape of the object based on the acquired plurality of images and the determined reliability.

* * * * *